United States Patent [19]
Ito et al.

[11] Patent Number: 5,838,500
[45] Date of Patent: Nov. 17, 1998

[54] HIGH-POWERED ZOOM LENS SYSTEM

[75] Inventors: Takayuki Ito; Sachio Hasushita, both of Tokyo, Japan

[73] Assignee: Asahi Kogaku Kogyo Kabushiki Kaisha, Tokyo, Japan

[21] Appl. No.: 298,281

[22] Filed: Aug. 31, 1994

[30] Foreign Application Priority Data

Aug. 31, 1993 [JP] Japan .................................. 5-215648

[51] Int. Cl.⁶ .................................................. G02B 15/14
[52] U.S. Cl. ............................................................ 359/689
[58] Field of Search ................................. 359/689, 686, 359/791

[56] References Cited

U.S. PATENT DOCUMENTS

| | | | |
|---|---|---|---|
| 4,812,026 | 3/1989 | Iima | 350/459 |
| 4,978,204 | 12/1990 | Ito | 350/423 |
| 4,983,027 | 1/1991 | Kojima et al. | 350/427 |
| 5,033,832 | 7/1991 | Ito | 350/427 |
| 5,105,311 | 4/1992 | Tokumaru et al. | 359/686 |
| 5,148,321 | 9/1992 | Goto et al. | 359/689 |
| 5,218,476 | 6/1993 | Ito | 359/676 |
| 5,260,833 | 11/1993 | Ito et al. | 359/689 |
| 5,315,439 | 5/1994 | Ito | 359/689 |
| 5,331,463 | 7/1994 | Yamanashi | 359/689 |
| 5,343,329 | 8/1994 | Ito | 359/689 |
| 5,566,026 | 10/1996 | Yoon | 359/689 |

FOREIGN PATENT DOCUMENTS 2-73211   3/1990   Japan .
3282409  12/1991   Japan .

*Primary Examiner*—Georgia Y. Epps
*Assistant Examiner*—Dawn-Marie Bey
*Attorney, Agent, or Firm*—Greenblum & Bernstein P.L.C.

[57] ABSTRACT

A high-powered zoom lens system comprising at least three lens groups including a first positive lens group, a second positive lens group, and a negative lens group, arranged in this order as viewed from the side of an object to be photographed. The three lens groups are moved toward the object to be photographed during zooming from a wide-angle extremity to a telephoto extremity. The negative lens group satisfies the relationships defined by (1) $3.3 < m_{Tn} < 6$ and (2) $2.5 < m_{Tn}/m_{wn} < 4$, wherein "$m_{Tn}$" represents the lateral magnification of the negative lens group at the telephoto extremity, and "$m_{wn}$" represents the lateral magnification of the negative lens group at the wide-angle extremity, respectively.

6 Claims, 12 Drawing Sheets

F= 3.8

— SA
--- SC

-0.5  0.5
SPHERICAL
ABERRATION
SINE CONDITION

F= 3.8

— d LINE
--- g LINE
- - - c LINE

-0.5  0.5
SPHERICAL
ABERRATION
CHROMATIC
ABERRATION

W= 28.3°

— S
--- M

-0.5  0.5
ASTIGMATISM

W= 28.3°

-2.0  2.0 %
DISTORTION

F= 5.8
— SA
--- SC
-0.5  0.5
SPHERICAL ABERRATION
SINE CONDITION

F= 5.8
— d LINE
--- g LINE
– – c LINE
-0.5  0.5
SPHERICAL ABERRATION
CHROMATIC ABERRATION

W= 16.7°
— S
--- M
-0.5  0.5
ASTIGMATISM

W= 16.7°
-2.0  2.0 %
DISTORTION

F= 9.5
— SA
--- SC
-0.5  0.5
SPHERICAL ABERRATION
SINE CONDITION

F= 9.5
— d LINE
--- g LINE
– – c LINE
-0.5  0.5
SPHERICAL ABERRATION
CHROMATIC ABERRATION

W= 9.3°
— S
--- M
-0.5  0.5
ASTIGMATISM

W= 9.3°
-2.0  2.0 %
DISTORTION

ZOOMING

F= 4.3

SPHERICAL ABERRATION
SINE CONDITION

— SA
--- SC

F= 4.3

SPHERICAL ABERRATION
CHROMATIC ABERRATION

—— d LINE
······ g LINE
- - - c LINE

W= 28.3°

ASTIGMATISM

— S
--- M

W= 28.3°

DISTORTION

F= 6.5

— SA
--- SC

-0.5  0.5
SPHERICAL
ABERRATION

SINE CONDITION

F= 6.5

—— d LINE
------ g LINE
— — c LINE

-0.5  0.5
SPHERICAL
ABERRATION

CHROMATIC
ABERRATION

W= 16.7°

— S
--- M

-0.5  0.5
ASTIGMATISM

W= 16.7°

-2.0  2.0 %
DISTORTION

F= 10.5

— SA
--- SC

-0.5  0.5
SPHERICAL
ABERRATION

SINE CONDITION

F= 10.5

—— d LINE
------ g LINE
— — c LINE

-0.5  0.5
SPHERICAL
ABERRATION

CHROMATIC
ABERRATION

W= 9.3°

— S
--- M

-0.5  0.5
ASTIGMATISM

W= 9.3°

-2.0  2.0 %
DISTORTION

F= 5.8

-0.5  0.5
SPHERICAL ABERRATION
SINE CONDITION

— SA
--- SC

F= 5.8

-0.5  0.5
SPHERICAL ABERRATION
CHROMATIC ABERRATION

— d LINE
······ g LINE
- - c LINE

W= 16.7°

-0.5  0.5
ASTIGMATISM

— S
--- M

W= 16.7°

-2.0  2.0 %
DISTORTION

F= 9.5

-0.5  0.5
SPHERICAL ABERRATION
SINE CONDITION

— SA
--- SC

F= 9.5

-0.5  0.5
SPHERICAL ABERRATION
CHROMATIC ABERRATION

— d LINE
······ g LINE
- - c LINE

W= 9.3°

-0.5  0.5
ASTIGMATISM

— S
--- M

W= 9.3°

-2.0  2.0 %
DISTORTION

FIG. 16
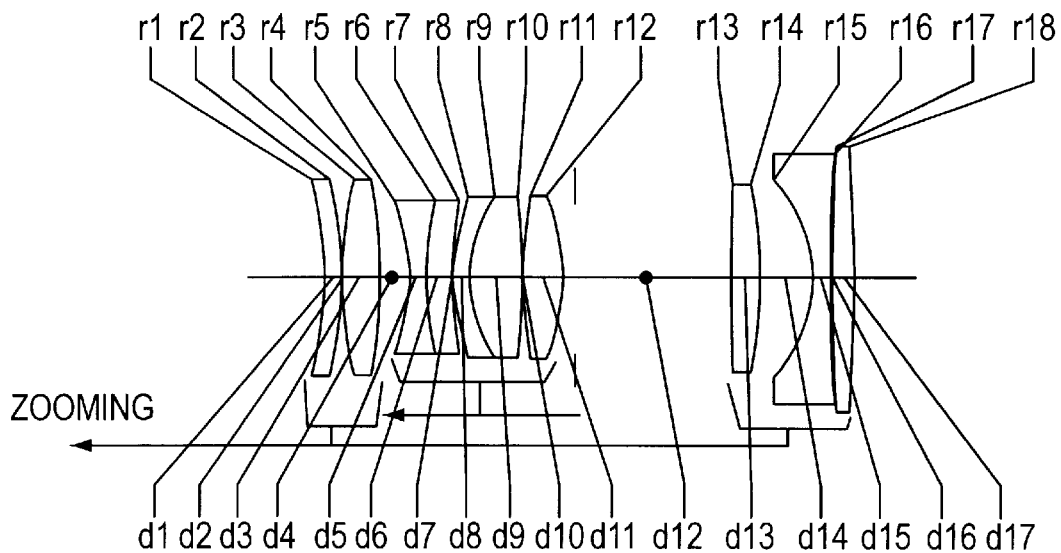
r1 r2 r3 r4 r5 r6 r7 r8 r9 r10 r11 r12  r13 r14 r15 r16 r17 r18
ZOOMING
d1 d2 d3 d4 d5 d6 d7 d8 d9 d10 d11 d12 d13 d14 d15 d16 d17
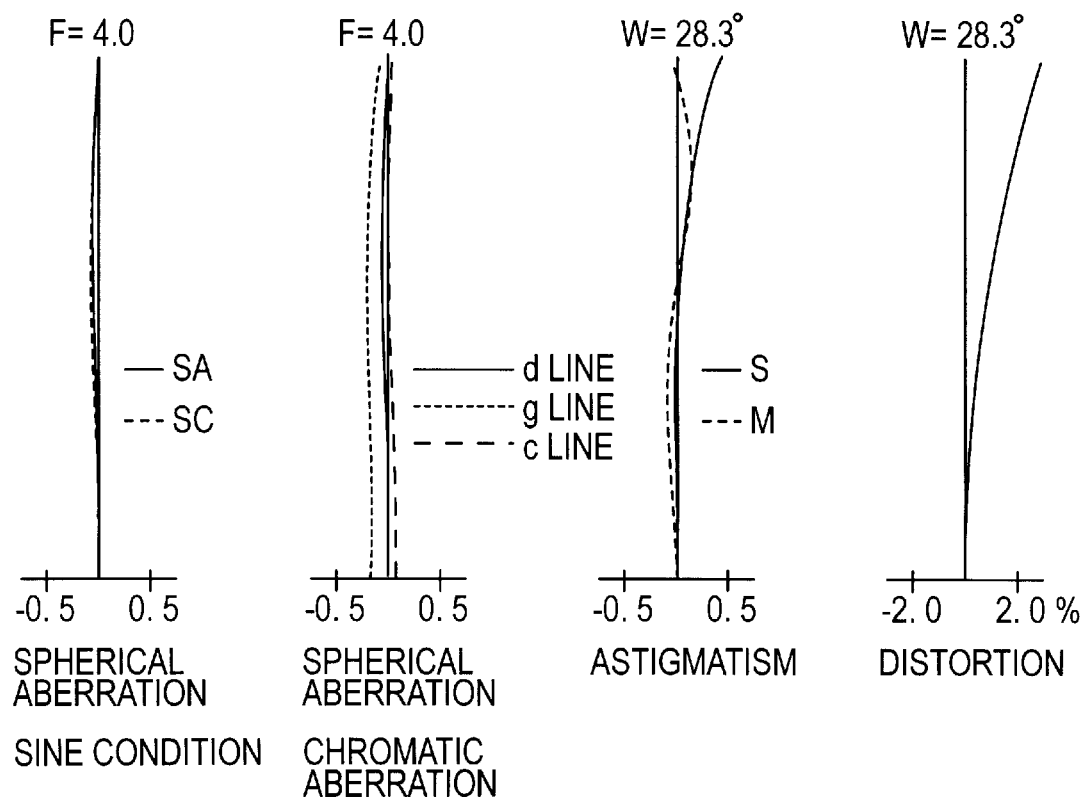
FIG. 17A
F= 4.0
— SA
--- SC
-0.5  0.5
SPHERICAL ABERRATION
SINE CONDITION
FIG. 17B
F= 4.0
— d LINE
······ g LINE
— — c LINE
-0.5  0.5
SPHERICAL ABERRATION
CHROMATIC ABERRATION
FIG. 17C
W= 28.3°
— S
--- M
-0.5  0.5
ASTIGMATISM
FIG. 17D
W= 28.3°
-2.0  2.0 %
DISTORTION

F= 5.8

-0.5  0.5
SPHERICAL ABERRATION
SINE CONDITION

— SA
--- SC

F= 5.8

-0.5  0.5
SPHERICAL ABERRATION
CHROMATIC ABERRATION

— d LINE
······ g LINE
– – c LINE

W= 16.7°

-0.5  0.5
ASTIGMATISM

— S
--- M

W= 16.7°

-2.0  2.0 %
DISTORTION

F= 8.5

-0.5  0.5
SPHERICAL ABERRATION
SINE CONDITION

— SA
--- SC

F=8.5

-0.5  0.5
SPHERICAL ABERRATION
CHROMATIC ABERRATION

— d LINE
······ g LINE
– – c LINE

W= 9.3°

-0.5  0.5
ASTIGMATISM

— S
--- M

W= 9.3°

-2.0  2.0 %
DISTORTION

HIGH-POWERED ZOOM LENS SYSTEM

BACKGROUND OF THE INVENTION

1. Field of the Invention

The present invention relates to a high-powered zoom lens system having a high degree of magnification, and more precisely, relates to a physically small zoom lens having a high zooming ratio (more than 3), that can effectively correct a chromatic aberration and that can be advantageously used for a compact camera in which the back-focal distance is short.

2. Description of the Related Art

In most conventional zoom lens systems for compact cameras, even if they are referred to as a high-powered zoom lens, the degree of zooming ratio is smaller than 3, as shown for example in Japanese Patent Kokai Publication No. 2-73211. In a high-powered zoom lens which has a high zooming ratio more than 3, if an attempt is made to reduce the length of the lens in order to obtain a small zoom lens, a chromatic aberration occurs on the long focal length side which is opposite in direction to a chromatic aberration which may occur on the short focal length side. Accordingly, it is difficult to effectively correct this kind of aberration.

SUMMARY OF THE INVENTION

It is an object of the present invention to provide a high-powered small zoom lens system for a compact camera, having a magnification (power) exceeding 3, wherein the chromatic aberration can be effectively corrected.

To achieve the object mentioned above, according to an aspect of the present invention, a high-powered zoom lens system comprising at least three lens groups including a first positive lens group, a second positive lens group, and a negative lens group, arranged in this order as viewed from the side of an object to be photographed. These three lens groups are moved towards the object to be photographed during the zooming operation from the wide-angle extremity to the telephoto extremity. The negative lens group satisfies the following relationship;

(1) $3.3 < m_{Tn} < 6$ (2) $2.5 < m_{Tn}/m_{wn} < 4$ wherein "$m_{Tn}$" represents the lateral magnification of the negative lens group at the telephoto extremity and "$m_{wn}$" represents the lateral magnification of the negative lens group on the wide-angle extremity, respectively.

According to another aspect of the present invention, a high-powered zoom lens system is provided comprising at least three lens groups including a first positive lens group, a second positive lens group, and a negative lens group, arranged in this order as viewed from the side of an object to be photographed. The three lens groups are moved towards the object to be photographed during the zooming operation from the wide angle extremity to the telephoto extremity. The negative lens group comprises at least three lenses including a positive lens, a negative lens and a positive lens, arranged in this order from the object side and satisfies the following relationship;

(3) $1 < f_T/f_{n-1} < 3$ (4) $1.7 < N_{n-2}$ (5) $10 < v_{n-2} - v_{n-3}$ wherein "$f_T$" represents the focal length of the whole lens system on telephoto extremity; "$f_{n-1}$" represents focal length of the object-side positive lens of the negative lens group; "$N_{n-2}$" represents the refractive index of the image-side positive lens of the negative lens group; "$v_{n-3}$" is the Abbe number of the image-side positive lens of the negative lens group; and, "$v_{n-2}$" is the Abbe number of the negative lens belonging to the negative lens group, respectively.

Preferably, the object-side positive lens of the negative lens group is made of a plastic lens hating at least one aspheric lens surface, and satisfies the following relationship;

(6) $1 < f_T/f_{n-1} < 2.3$

Preferably, the first positive lens group and the negative lens group are moved together during the zooming operation.

The present disclosure relates to subject matter contained in Japanese patent application No. 05-215648 (filed on Aug. 31, 1993) which is expressly incorporated herein by reference in its entirety.

BRIEF DESCRIPTION OF THE DRAWINGS

The invention will be described below in detail with reference to the accompanying drawings, in which;

FIG. 16 is a schematic view for a lens arrangement for a high-powered zoom lens system, according to a fourth embodiment of the present invention;

FIGS. 17A–17D, 18A–18D, and 19A–19D show various aberration diagrams for a zoom lens system shown in FIG. 16; and, FIG. 20 is an explanatory view of the range of movement that the lens groups in a high-powered zoom lens system shown in FIG. 16, go through during a complete zooming operation.

DESCRIPTION OF THE PREFERRED EMBODIMENT

Figure 1:
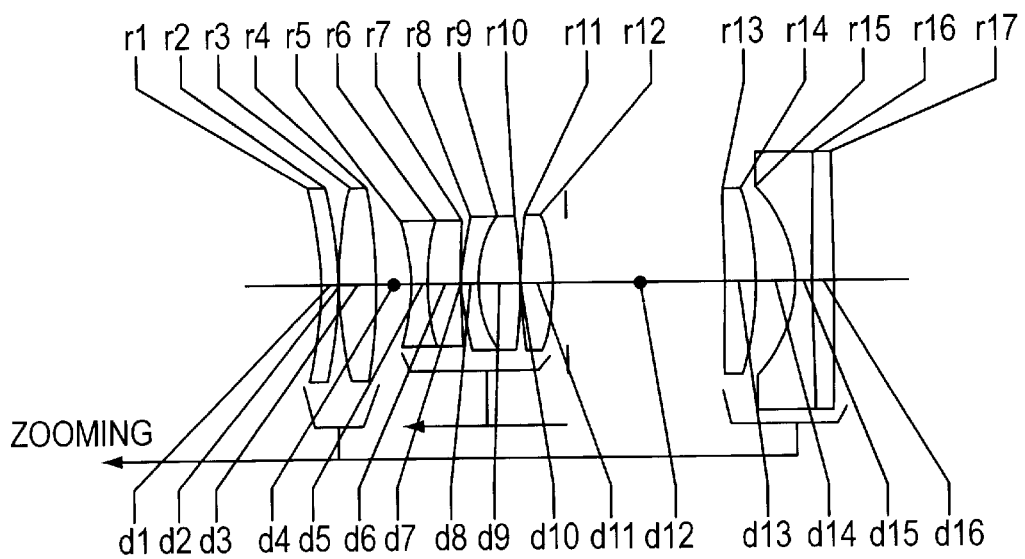
FIG. 1 is a schematic view of a lens arrangement of a high-powered zoom lens system, according to a first embodiment of the present invention.
Figure 2A:
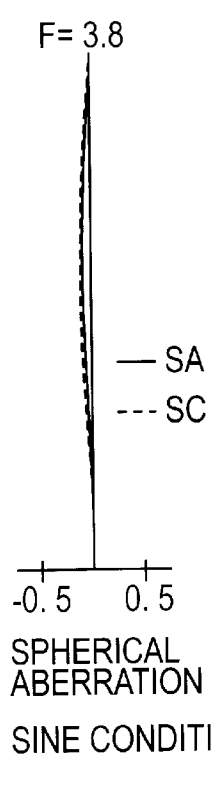
FIGS. 2A–2D, 3A–3D, and 4A–4D show various aberration diagrams of a high-powered zoom lens system shown in FIG. 1.
Figure 2B:
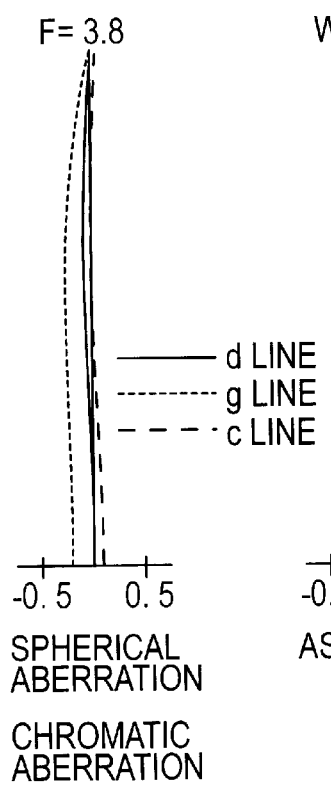
Figure 2C:
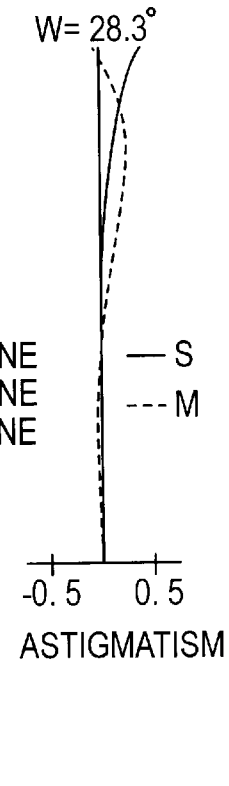
Figure 2D:
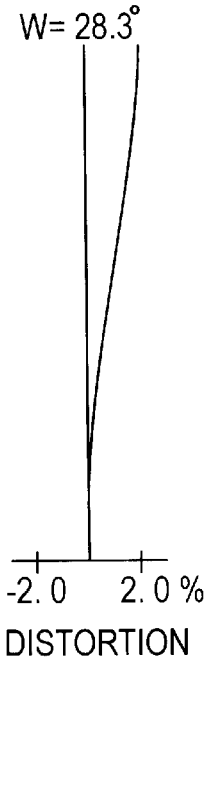
Figure 3A:
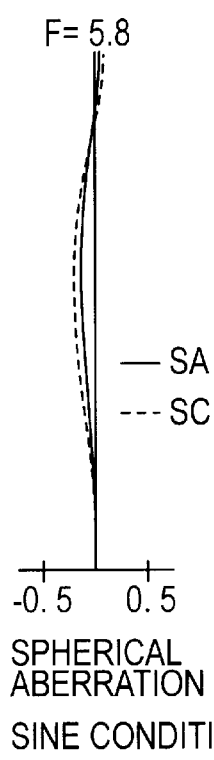
Figure 3B:
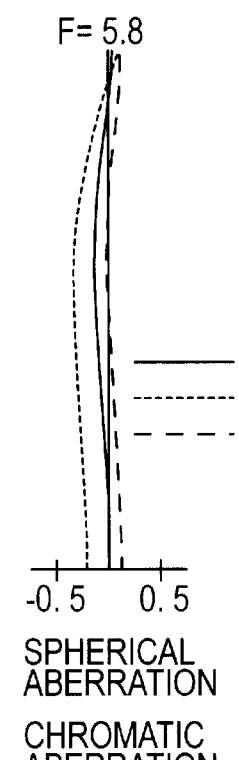
Figure 3C:
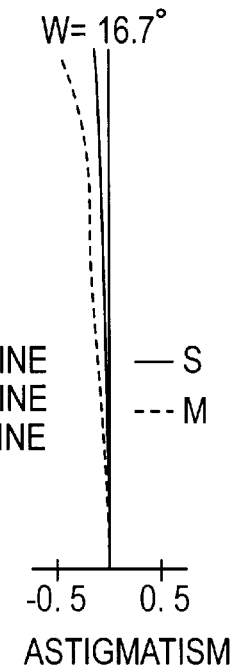
Figure 3D:
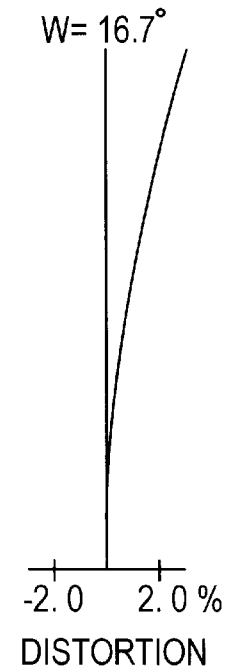
Figure 4A:
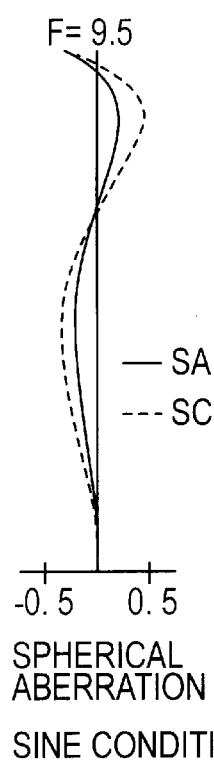
Figure 4B:
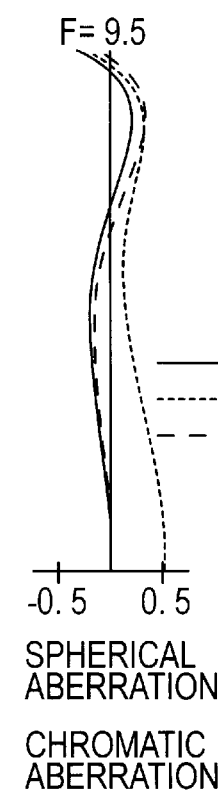
Figure 4C:
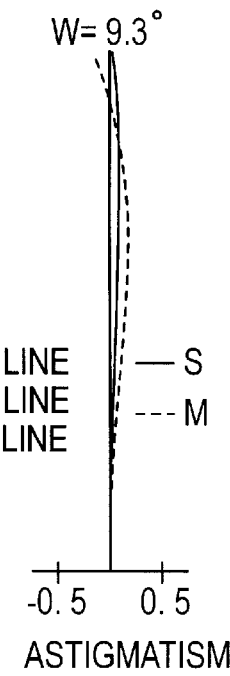
Figure 4D:
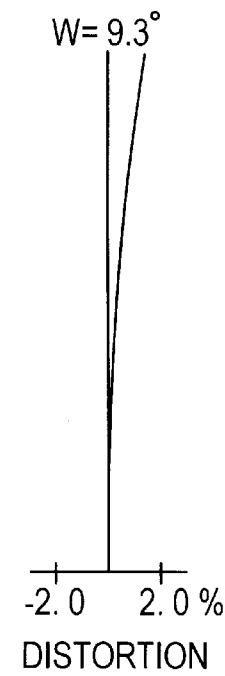

It is necessary to provide at least three lens groups to minimize the movement of the lens groups in a small high-powered zoom lens. To reduce the whole length and displacement of the zoom lens, there are preferably a first positive lens group, a second positive lens group and a negative lens group, located in this order from the side of an object to be photographed. To correct the chromatic aberration, the negative lens group is comprised of at least three lenses, i.e., a positive lens, a negative lens and a positive lens, in this order from the object side.

The formulae (1) and (2) relate to the requirements to obtain a variable power exceeding 3 and at the same time obtain a small zoom lens. They also specify the lateral magnification of the negative lens group which has a large power on the long focal length side and the variable power ratio. If the values of the requirements (1) and (2) are smaller than the respective lower limits, it is impossible to obtain a large variable power ratio. Conversely, if the values of the requirements (1) and (2) are larger than the respective upper limits, a large variable power ratio can be obtained, but the aberration variation caused by zooming is too large to be effectively corrected.

Formulae (3), (4) and (5) are related to the negative lens group. Formula (3) specifies the power of the object-side positive lens of the negative lens group. If the value of the ratio defined in formula (3) is smaller than the lower limit, the power is too small to effectively correct the aberration of the negative lens group. Consequently, there is a large amount of aberration at the zooming extremes. Conversely, if the value of the ratio defined in formula (3) is larger than the upper limit, high order aberration is apt to occur. Moreover, the quality of the zoom lens is very sensitive to manufacturing errors, such as an error in the distance between the positive lens and the negative lens, behind the same or an axial deviation of the lenses.

The object-side positive lens of the negative lens group is preferably made of a plastic lens to reduce the manufacturing cost. Preferably, the object-side positive lens of the negative lens group has at least one aspheric surface which can effectively compensate for the aberration. It should be appreciated that if the positive lens is made of a plastic lens, the power thereof is preferably smaller than the upper limit defined in formula (3), as can be seen from formula (6). If the power is larger than the upper limit of formula (6), the focus is very sensitive to changes in temperature or humidity.

Formulae (4) and (5) specify the requirements for achromatization in the negative lens group to supplement the achromatization by the object-side positive lens of the negative lens group and the negative lens located behind this positive lens.

As can be seen in formula (3), the object-side positive lens of the negative lens group cannot have a large power. Therefore, if the power of the whole negative lens group is large enough to satisfy the requirements defined in formulae (1) and (2), it is impossible to completely compensate for the chromatic aberration by only using the object-side positive lens of the negative lens group and the negative lens behind the same. Consequently, large chromatic aberrations in opposite directions occur at the telephoto extremity and at the wide-angle extremity. To avoid this, according to one of the significant features of the present invention, the positive lens that satisfies the requirements defined in formulae (4) and (5) is provided behind the negative lens, so that even if the thickness of the positive lens is small, the chromatic aberration can be effectively eliminated and the diameter of the negative lens group can be decreased.

If the values of formulae (4) and (5) are smaller than the respective lower limits, it is difficult to correct the chromatic aberration. To correct the chromatic aberration, the power of the negative lens and the power of the image-side positive lens must be increased. To this end, it is necessary to increase the thickness of the image-side positive lens and the diameter of the negative lens group in order to obtain the necessary thickness at the peripheral edges thereof.

Note that the present invention can be applied to a zoom lens system in which the first positive lens group and the second positive lens group are split into more than one lens group and which can be independently moved. Namely, the "negative lens group" referred to in the present invention is not necessarily a third lens group of the lens system. In other words, the "negative lens group" could be a fourth or a fifth lens group of the lens system counted from the object to be photographed.

Preferably, the first positive lens group and the negative lens group are moved together during the zooming in order to simplify the mechanical arrangement of the lens system. In addition to the foregoing, the focus is insensitive to the positional error of the lens groups, thus resulting in a high quality zoom lens.

Figure 5:
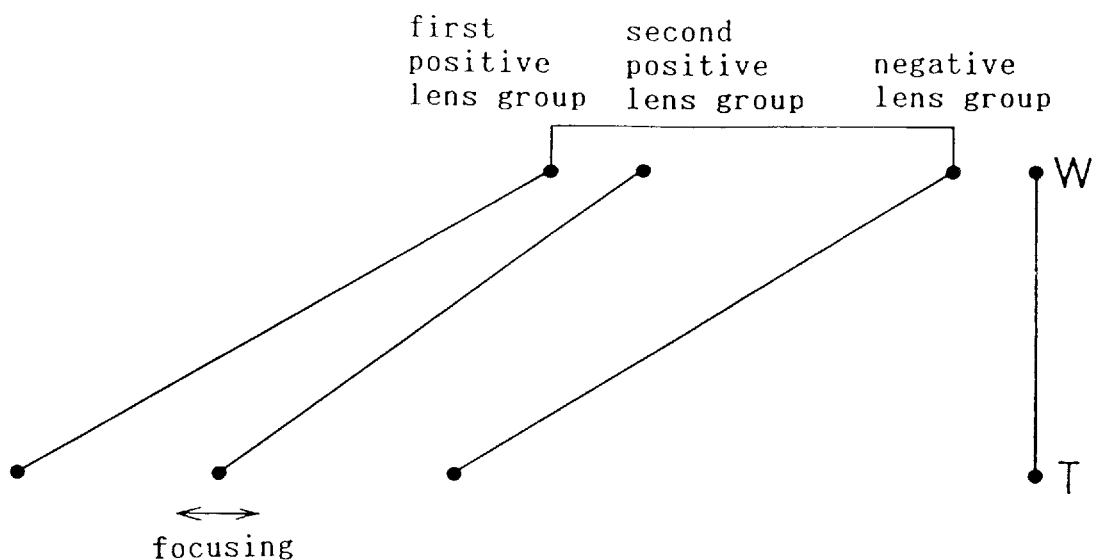
FIG. 5 is an explanatory view of the range of movement that the lens groups in a high-powered zoom lens system shown in FIG. 1, go through during a complete zooming operation.

First Embodiment:

FIG. 1 shows a lens arrangement of a high-powered zoom lens system according to a first embodiment of the present invention. FIG. 5 shows a locus of points along which the lens system travels from the wide-angle extremity W to the telephoto extremity T during the zooming operation. In the illustrated embodiment, the first positive lens group and the negative lens group are moved together during the zooming. The focusing is achieved by the second positive lens group.

Numerical data for the zoom lens system shown in FIG. is shown in Table 1 below. Various aberrations thereof, at different focal lengths, are shown in FIGS. 2, 3 and 4, respectively. In FIGS. 2 through 4, "SA" designates the spherical aberration, "SC" the sine condition, "d-line", "g-line" and "C-line" the chromatic aberration represented by the spherical aberration, at the respective wavelengths, "S" the sagittal ray, and "M" the meridional ray, respectively.

In the Table and the drawings, "$F_{NO}$" designates the f-number, "F" the focal length, "ω" the half angle of view, "FB" the back-focal distance, "r i" the radius of curvature of each lens surface, "di" the lens thickness or the distance between the lenses, "N" the refractive index, and "ν" the Abbe number, respectively.

TABLE 1

$F_{NO}$ = 1:3.8–5.8–9.5
F = 39.30–70.00–130.00
ω = 28.3–16.7–9.3
$F_B$ = 9.75–30.72–70.62

| surface NO. | r | d | N | ν |
|---|---|---|---|---|
| 1 | −33.565 | 1.40 | 1.84666 | 23.8 |
| 2 | −45.184 | 0.10 | — | |
| 3 | 38.279 | 3.36 | 1.48749 | 70.2 |
| 4 | −56.478 | 3.11–10.35–15.43 | — | |
| 5 | −16.423 | 1.40 | 1.77250 | 49.6 |
| 6 | 20.970 | 2.84 | 1.80518 | 25.4 |
| 7 | 47.135 | 0.20 | — | |
| 8 | 20.807 | 1.40 | 1.68893 | 31.1 |
| 9 | 11.509 | 3.59 | 1.58913 | 61.2 |
| 10 | −71.744 | 0.20 | — | |
| 11 | 47.275 | 2.93 | 1.58313 | 59.4 |
| 12* | −17.805 | 1.21 | — | |
| STOP | ∞ | 14.04–6.81–1.72 | | |
| 13* | −87.088 | 2.81 | 1.58547 | 29.9 |
| 14 | −27.513 | 3.50 | — | |

TABLE 1-continued $F_{NO} = 1:3.8–5.8–9.5$
$F = 39.30–70.00–130.00$
$\omega = 28.3–16.7–9.3$
$F_B = 9.75–30.72–70.62$

| surface NO. | r | d | N | υ |
|---|---|---|---|---|
| 15 | −12.193 | 1.50 | 1.77250 | 49.6 |
| 16 | 227.340 | 2.00 | 1.80518 | 25.4 |
| 17 | −497.868 | — | — | |

*marked surface is aspherical.
NO. 12: K = 0.0, A4 = 0.58624 × 10⁻⁴, A6 = 0.10699 × 10⁻⁶,
A8 = 0.13007 × 10⁻⁸, A10 = 0.0, A12 = 0.0,
NO. 13: K = 0.0, A4 = 0.55463 × 10⁻⁴, A6 = 0.23023 × 10⁻⁷,
A8 = 0.16997 × 10⁻⁸, A10 = 0.25153 × 10⁻¹¹, A12 = 0.0
$m_{T2} = 0.48$
$m_{T2} = 4.17 = m_{Tn}$
$m_{W2} = 1.48 = m_{Wn}$
$m_{Tn}/m_{Wn} = 2.82$ The shape of the asperic surface can be generally expressed as follows.

$$X = CY^2/\{1 + [1-(1+K)C^2Y^2]^{1/2}\} + A_4Y^4 + A_6Y^6 + A_8Y^8 + A_{10}Y^{10} + A_{12}Y^{12}$$

wherein,

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents an eighth-order aspherical factor, $A_{10}$ represents a tenth-order aspherical factor.

$A_{12}$ represents a twelfth-order aspherical factor.

Figure 6:
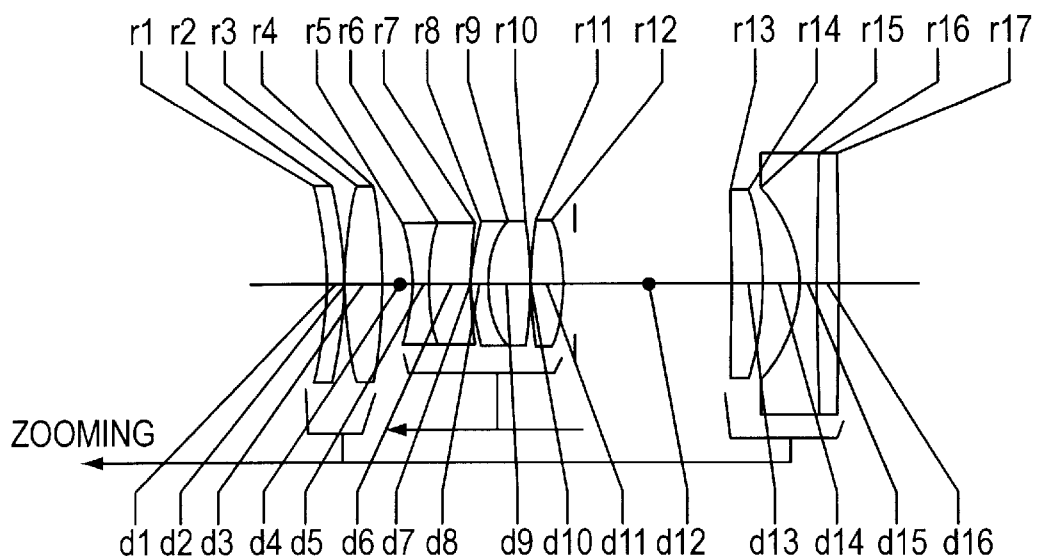
FIG. 6 is a schematic view of a lens arrangement of a high-powered zoom lens system, according to a second embodiment of the present invention.
Figure 7A:
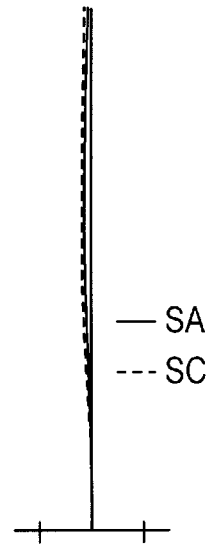
FIGS. 7A–7D, 8A–8D, and 9A–9D show various aberration diagrams for a zoom lens system shown in FIG. 6.
Figure 7B:
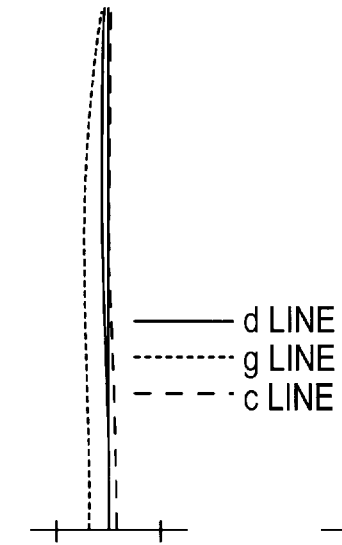
Figure 7C:
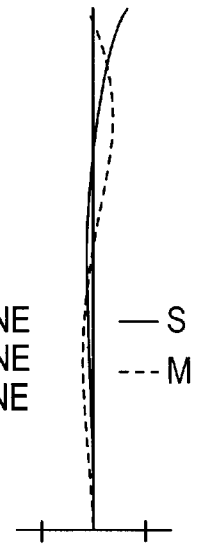
Figure 7D:
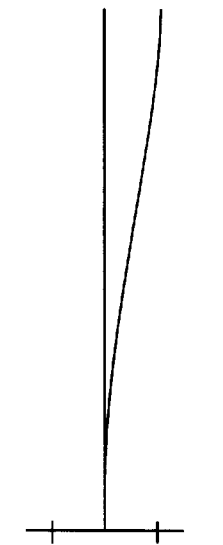
Figure 8A:
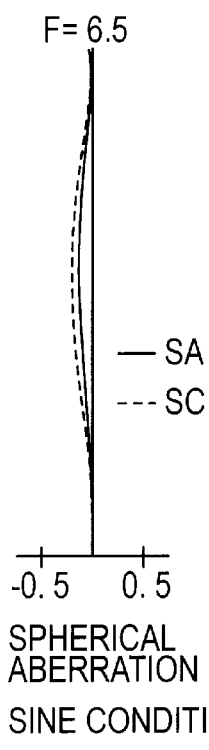
Figure 8B:
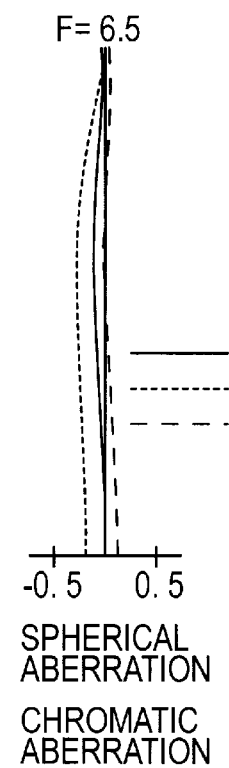
Figure 8C:
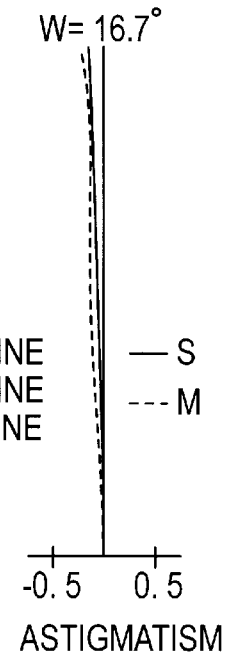
Figure 8D:
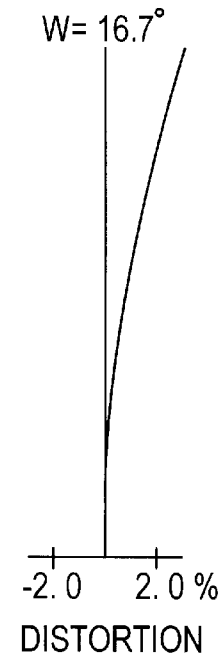
Figure 9A:
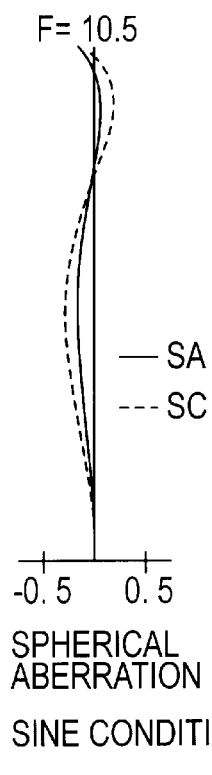
Figure 9B:
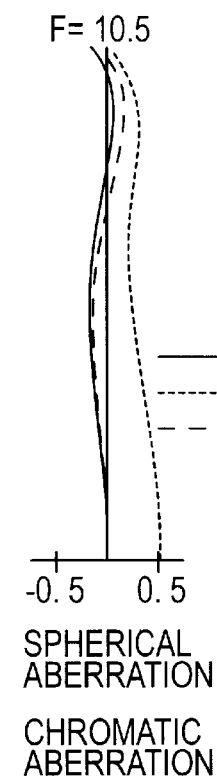
Figure 9C:
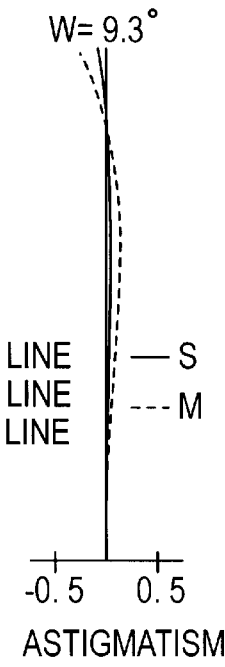
Figure 9D:
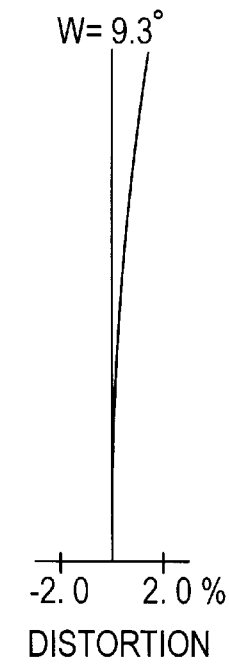

Second Embodiment:

FIG. 6 shows a lens arrangement for a high-powered zoom lens system, according to a second embodiment of the present invention.

Figure 10:
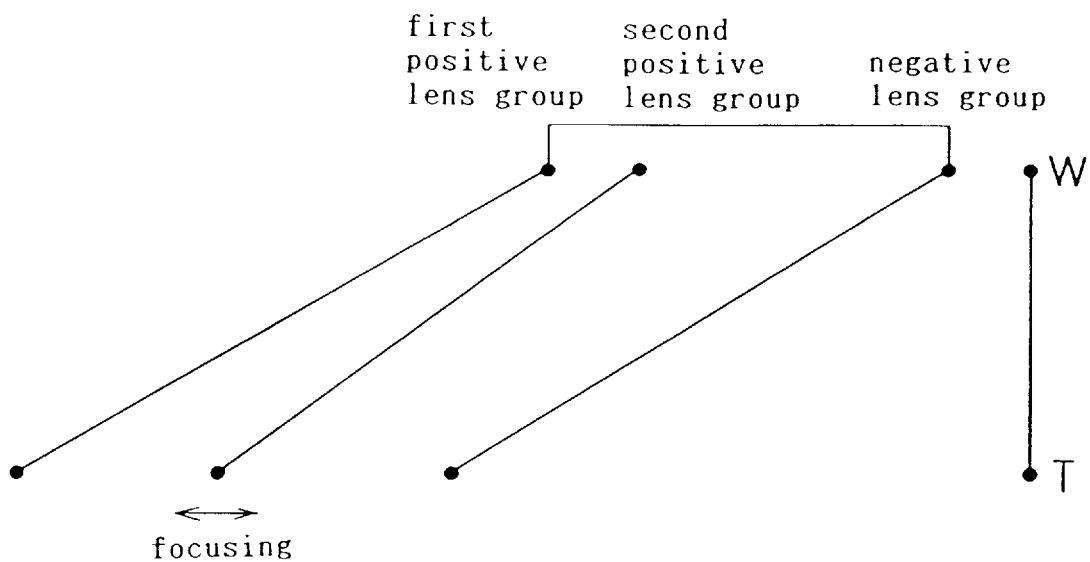
FIG. 10 is an explanatory view of the displacement of lens groups in a high-powered zoom lens system shown in FIG. 6, during zooming.

Numerical data for the lens system shown in FIG. 6 is shown in Table 2 below. Diagrams of various aberrations thereof are shown in FIGS. 7, 8 and 9 (ie. FIGS. 7A–7D, 8A–8D, and 9A–9D), respectively. FIG. 10 shows a locus of points along which the lens system travels during the zooming operation. Similar to the first embodiment, the first positive lens group and the negative lens group are moved together during the zooming. The focusing is achieved by the second positive lens group.

TABLE 2

$F_{NO} = 1:4.3–6.5–10.5$
$F = 39.30–70.00–130.00$
$\omega = 28.3–16.7–9.3$
$F_B = 10.00–30.81–70.30$

| surface NO. | r | d | N | υ |
|---|---|---|---|---|
| 1 | −33.950 | 1.40 | 1.84666 | 23.8 |
| 2 | −47.044 | 0.10 | — | |
| 3 | 35.072 | 3.36 | 1.48749 | 70.2 |
| 4 | −55.208 | 2.76–9.85–14.89 | — | |
| 5 | −16.903 | 1.40 | 1.77250 | 49.6 |
| 6 | 19.405 | 3.89 | 1.80518 | 25.4 |
| 7 | 46.412 | 0.20 | — | |
| 8 | 21.039 | 1.40 | 1.68893 | 31.1 |

TABLE 2-continued $F_{NO} = 1:4.3–6.5–10.5$
$F = 39.30–70.00–130.00$
$\omega = 28.3–16.7–9.3$
$F_B = 10.00–30.81–70.30$

| surface NO. | r | d | N | υ |
|---|---|---|---|---|
| 9 | 11.223 | 3.27 | 1.58913 | 61.2 |
| 10 | −65.898 | 0.20 | — | |
| 11 | 47.239 | 2.93 | 1.58313 | 59.4 |
| 12* | −18.615 | 1.36 | — | |
| STOP | ∞ | 13.87–6.77–1.74 | | |
| 13* | −66.286 | 2.94 | 1.58547 | 29.9 |
| 14 | −23.483 | 2.96 | — | |
| 15 | −11.978 | 1.50 | 1.77250 | 49.6 |
| 16 | 140.775 | 2.00 | 1.80518 | 25.4 |
| 17 | −1193.816 | — | — | |

Figure 11:
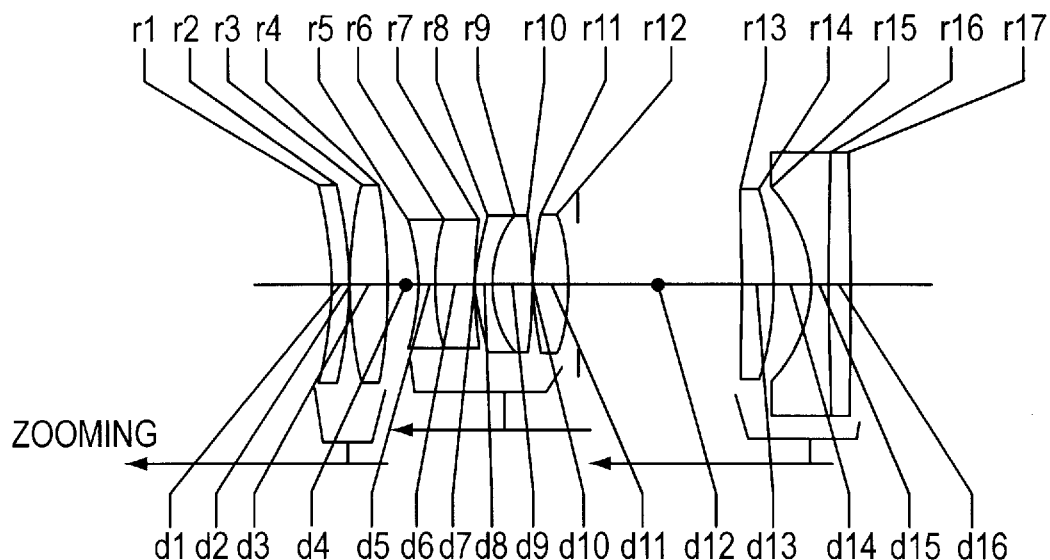
FIG. 11 is a schematic view of a lens arrangement for a high-powered zoom lens system, according to a third embodiment of the present invention.

*marked surface is aspherical.
NO. 12: K = 0.0, A4 = 0.52891 × 10⁻⁴, A6 = 0.12176 × 10⁻⁶,
A8 = −0.23721 × 10⁻⁸, A10 = 0.0, A12 = 0.0
NO. 13: K = 0.0, A4 = 0.57945 × 10⁻⁴, A6 = 0.31647 × 10⁻⁷,
A8 = 0.19401 × 10⁻⁸, A10 = 0.28943 × 10⁻¹¹, A12 = 0.0
$m_{T2} = 0.51$
$m_{T2} = 4.22 = m_{Tn}$
$m_{W2} = 1.51 = m_{Wn}$
$m_{Tn}/m_{Wn} = 2.80$ Third Embodiment:

FIG. 11 shows a lens arrangement of a high-powered zoom lens system, according to a third embodiment of the present invention.

Figures 12A, 12B, 12C, 12D:
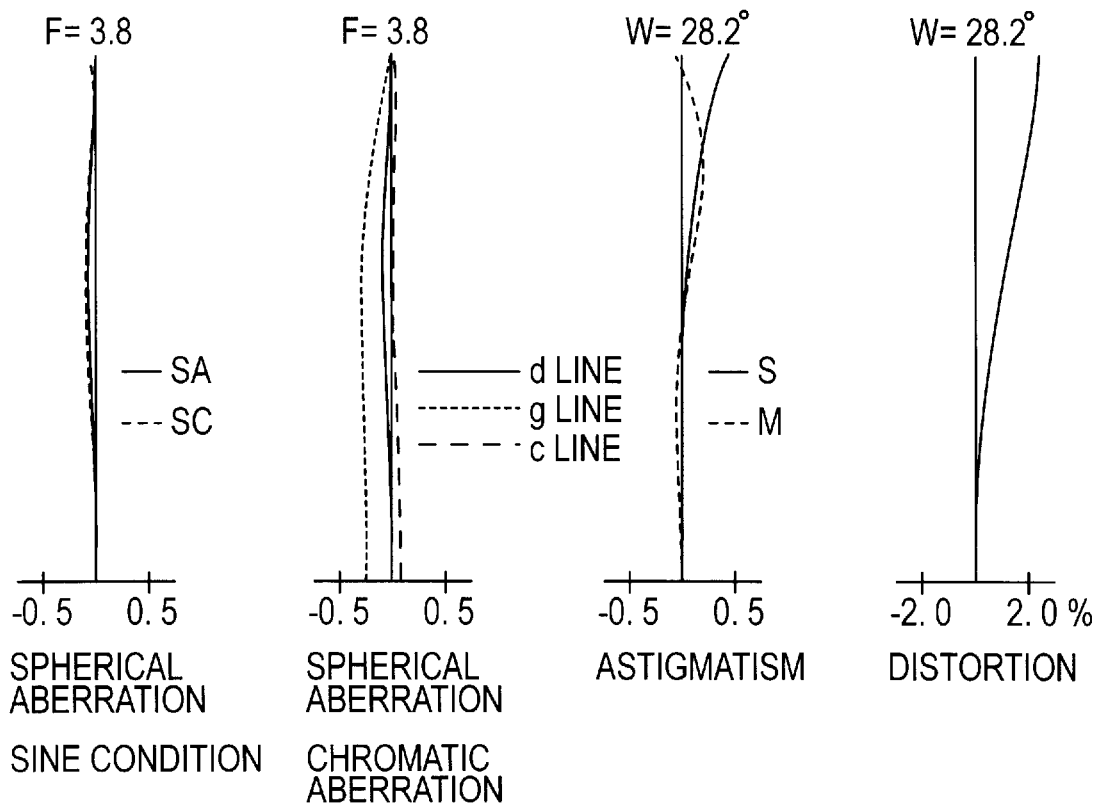
FIGS. 12A–12D, 13A–13D, and 14A–14D show various aberration diagrams for a zoom lens system shown in FIG. 11.
Figure 13A:
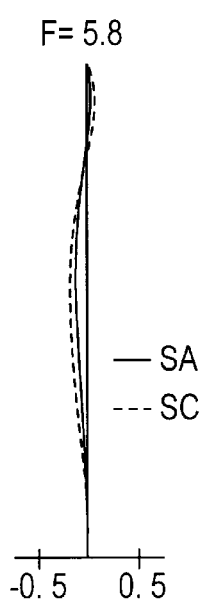
Figure 13B:
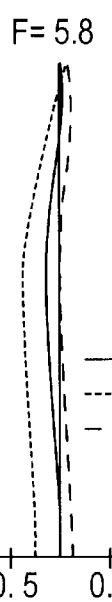
Figure 13C:
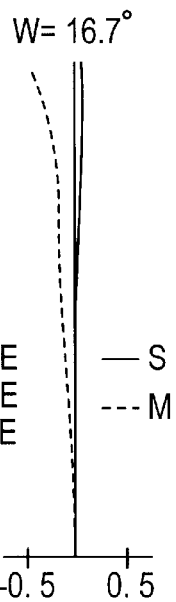
Figure 13D:
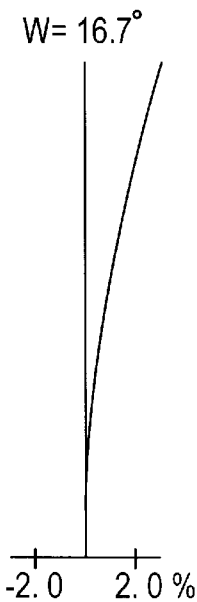
Figure 14A:
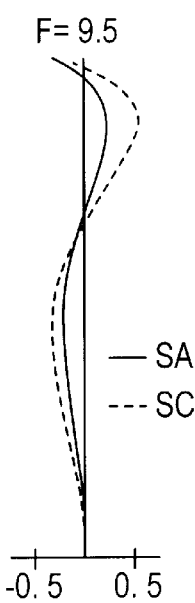
Figure 14B:
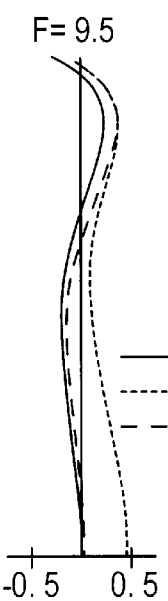
Figure 14C:
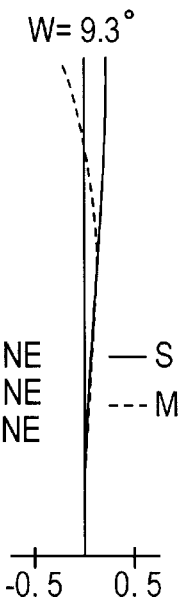
Figure 14D:
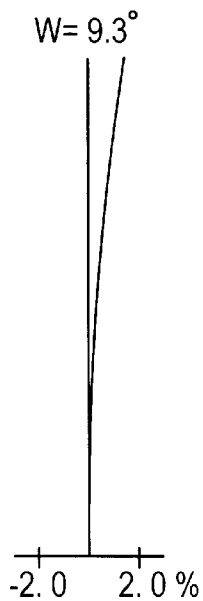

Numerical data of the lens system shown in FIG. 11 is shown in Table 3 below. Various aberrations thereof at different focal lengths are shown in FIGS. 12, 13, and 14 (ie. FIGS. 12A–12D, 13A–13D, and 14A–14D), respectively.

Figure 15:
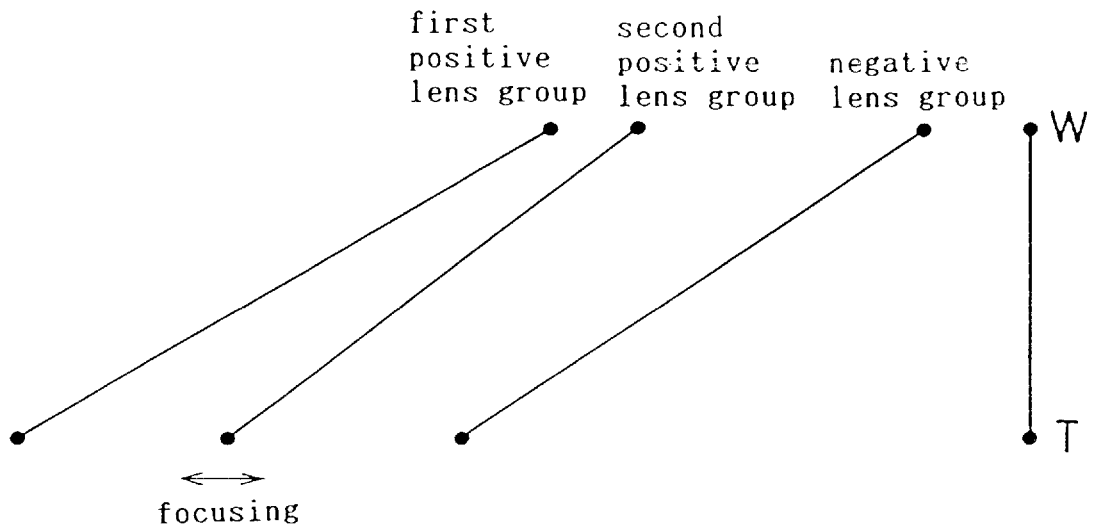
FIG. 15 is an explanatory view of the range of movement the lens groups in a high-powered zoom lens system shown in FIG. 11, go through during a complete zooming operation.
Figure 18A:
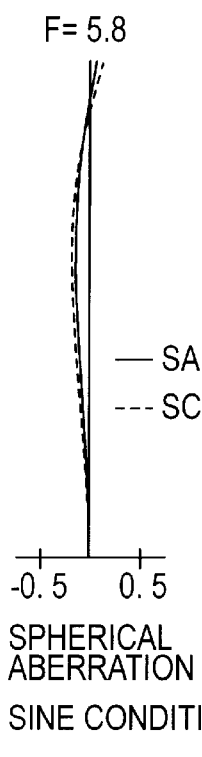
Figure 18B:
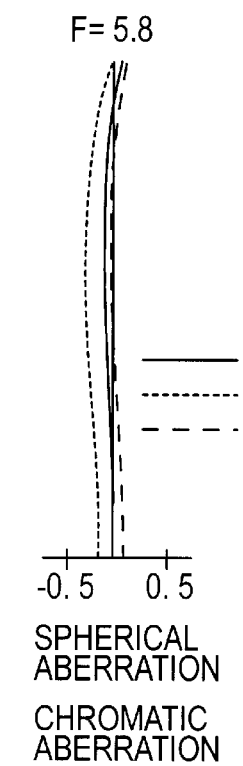
Figure 18C:
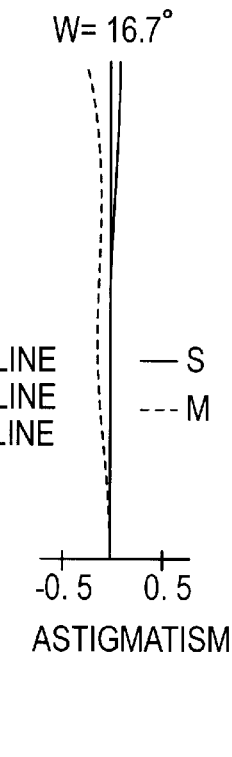
Figure 18D:
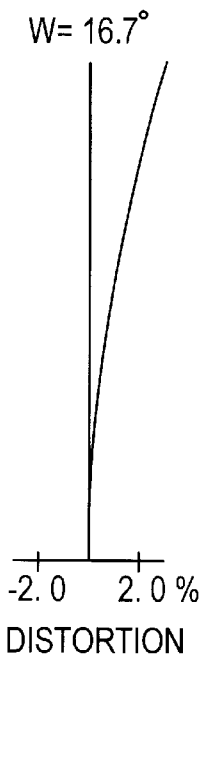
Figure 19A:
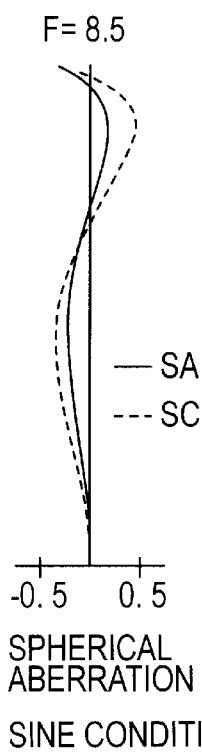
Figure 19B:
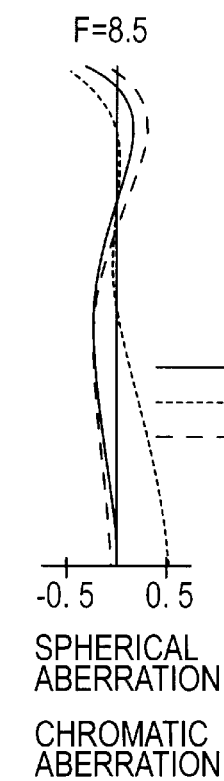
Figure 19C:
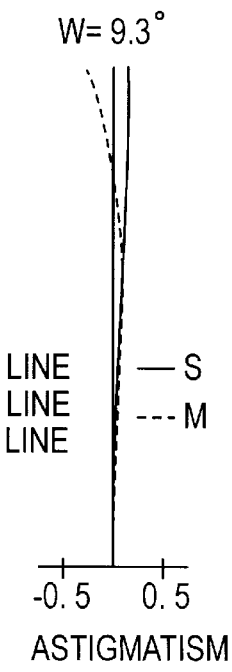
Figure 19D:
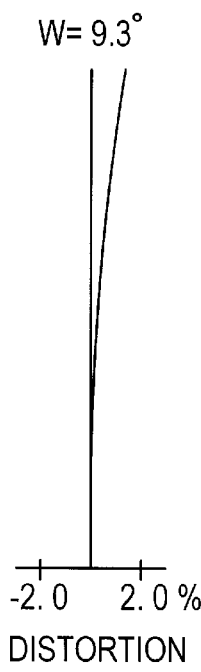

FIG. 15 shows a locus along which the lens system is moved from the wide-angle extremity W to the telephoto extremity T during the zooming operation. In the third embodiment, the first positive lens group and the negative lens group are separately moved during the zooming. The focusing is achieved by the second positive lens group.

TABLE 3

$F_{NO} = 1:3.8–5.8–9.6$
$F = 39.30–70.02–130.01$
$\omega = 28.2–16.7–9.3$
$F_B = 9.79–30.31–69.41$

| surface NO. | r | d | N | υ |
|---|---|---|---|---|
| 1 | −34.092 | 1.40 | 1.84666 | 23.8 |
| 2 | −48.183 | 0.10 | — | |
| 3 | 39.535 | 3.36 | 1.48749 | 70.2 |
| 4 | −54.300 | 2.79–10.96–16.56 | — | |
| 5 | −16.595 | 1.40 | 1.73400 | 51.5 |
| 6 | 17.771 | 3.32 | 1.80518 | 25.4 |
| 7 | 38.661 | 0.20 | — | |
| 8 | 20.673 | 1.40 | 1.69895 | 30.1 |
| 9 | 11.180 | 3.54 | 1.62041 | 60.3 |
| 10 | −96.648 | 0.20 | — | |
| 11 | 46.110 | 2.93 | 1.58913 | 61.2 |
| 12* | −18.501 | 0.92 | — | |
| STOP | ∞ | 14.31–7.17–2.11 | | |
| 13* | −86.818 | 2.82 | 1.58547 | 29.9 |
| 14 | −27.350 | 3.44 | — | |
| 15 | −12.308 | 1.50 | 1.77250 | 49.6 |
| 16 | 150.518 | 2.00 | 1.80518 | 25.4 |
| 17 | −1129.128 | — | — | |

*marked surface is aspherical.
NO. 12: K = 0.0, A4 = 0.58708 × 10⁻⁴, A6 = 0.111792 × 10⁻⁶,
A8 = −0.15982 × 10⁻⁸, A10 = 0.0, A12 = 0.0
NO. 13: K = 0.0, A4 = 0.54323 × 10⁻⁴, A6 = 0.30075 × 10⁻⁷, TABLE 3-continued $F_{NO}$ = 1:3.8–5.8–9.6
F = 39.30–70.02–130.01
ω = 28.2–16.7–9.3
$F_B$ = 9.79–30.31–69.41

| surface NO. | r | d | N | υ |
|---|---|---|---|---|

$A8 = 0.12396 \times 10^{-8}$, $A10 = 0.38473 \times 10^{-11}$, $A12 = 0.0$
$m_{T2} = 0.46$
$m_{T3} = 4.13 = m_{Tn}$
$m_{W3} = 1.48 = m_{Wn}$
$m_{Tn}/m_{Wn} = 2.79$ Fourth Embodiment:

FIG. 16 shows a lens arrangement for a high-powered zoom lens system, according to a fourth embodiment of the present invention.

Numerical data of the lens system shown in FIG. 16 is shown in Table 4 below. Various aberrations thereof at different focal lengths are shown in FIGS. 17, 18, and 19 (ie. FIGS. 17A–17D, 18A–18D, and 19A–19D), respectively.

Figure 20:
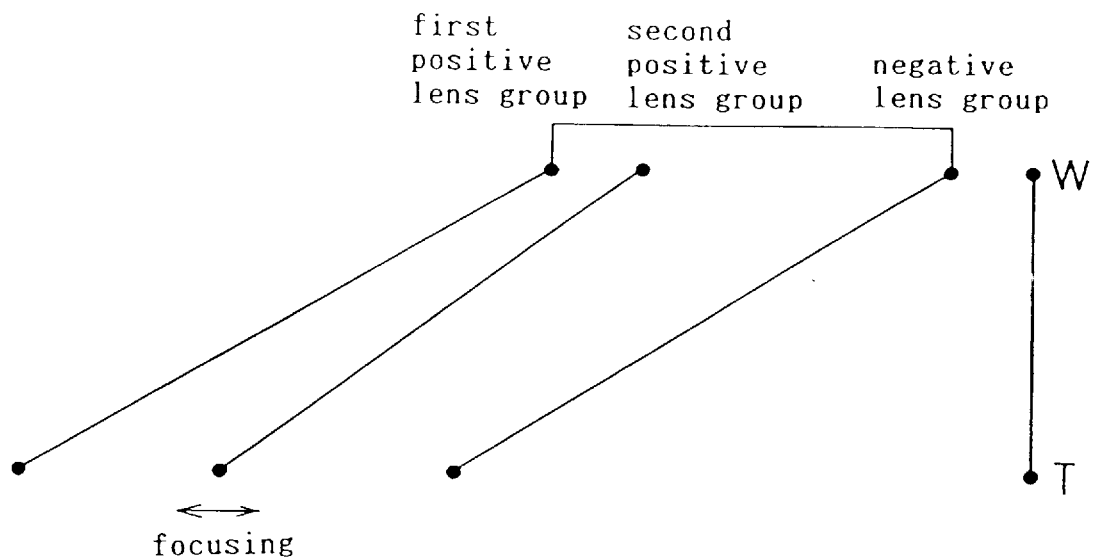

FIG. 20 shows a locus along which the lens system is moved from the wide-angle extremity W to the telephoto extremity T during the zooming operation. In the fourth embodiment, the first positive lens group and the negative lens group are moved together during the zooming. The focusing is achieved by the second positive lens group.

TABLE 4

$F_{NO}$ = 1:4.0–5.8–8.5
F = 39.00–70.0–130.00
ω = 28.3–16.7–9.3
$F_B$ = 9.05–30.47–70.92

| surface NO. | r | d | N | υ |
|---|---|---|---|---|
| 1 | −34.111 | 1.39 | 1.84666 | 23.8 |
| 2 | −44.661 | 0.10 | — | |
| 3 | 43.033 | 3.33 | 1.48749 | 70.2 |
| 4 | −55.738 | 2.61–10.00–15.08 | — | |
| 5 | −16.794 | 1.39 | 1.77250 | 49.6 |
| 6 | 19.932 | 2.53 | 1.80518 | 25.4 |
| 7 | 45.311 | 0.20 | — | |
| 8 | 21.168 | 1.39 | 1.69895 | 30.1 |
| 9 | 12.359 | 4.58 | 1.58913 | 61.2 |
| 10 | −59.461 | 0.20 | — | |
| 11 | 47.329 | 3.46 | 1.59240 | 68.3 |
| 12* | −19.305 | 0.96 | — | |
| STOP | ∞ | 14.10–6.71–1.63 | | |
| 13* | −139.171 | 2.56 | 1.58547 | 29.9 |
| 14 | −39.233 | 4.64 | — | |
| 15 | −12.929 | 1.49 | 1.77250 | 49.6 |
| 16 | 109.653 | 0.30 | — | |
| 17 | 233.843 | 1.98 | 1.80518 | 25.4 |
| 18 | −137.665 | — | — | |

*marked surface is aspherical.
NO. 12: $K = 0.0$, $A4 = 0.51546 \times 10^{-4}$, $A6 = 0.51059 \times 10^{-7}$,
$A8 = -0.34940 \times 10^{-9}$, $A10 = 0.0$ $A12 = 0.0$
NO. 13: $K = 0.0$, $A4 = 0.47362 \times 10^{-4}$, $A6 = 0.11196 \times 10^{-7}$,
$A8 = 0.11062 \times 10^{-8}$, $A10 = -0.28054 \times 10^{-12}$, $A12 = 0.0$
$m_{T2} = 0.46$
$m_{T3} = 4.16 = m_{Tn}$
$m_{W3} = 1.48 = m_{Wn}$
$m_{Tn}/m_{Wn} = 2.85$ values of the formulae (1) through (5) in the first, second, third and fourth embodiments are shown in Table 5 below.

TABLE 5

| | example 1 | example 2 | example 3 | example 4 |
|---|---|---|---|---|
| Formula (1) | 4.17 | 4.22 | 4.13 | 4.16 |
| Formula (2) | 2.82 | 2.80 | 2.79 | 2.85 |
| Formula (3) | 1.93 | 2.15 | 1.94 | 1.41 |
| Formula (4) | 1.805 | 1.805 | 1.805 | 1.805 |
| Formula (5) | 24.2 | 24.2 | 24.2 | 24.2 |

As can be seen from Table 5 above, all of the four embodiments satisfy the requirements defined by formulae (1) through (5). Moreover, according to the present invention, the variable power is more than 3, and the aberrations are correctly compensated.

As may be understood from the above discussion, according to the present invention, a small and high-powered zoom lens system can be obtained in which the aberrations, particularly, the chromatic aberration, are effectively compensated.

We claim:

1. A zoom lens system comprising:
   at least three lens groups including a first positive lens group, a second positive lens group, and a negative lens group, arranged in this order as viewed from a side of an object to be photographed; and
   an aperture stop between said second positive lens group and said negative lens group,
   said three lens groups all being moved toward the object to be photographed during a zooming operation from a wide-angle extremity to a telephoto extremity, wherein a zoom ratio of said zoom lens system is greater than three, and wherein said negative lens group satisfies the following relationships:
   $3.3 < m_{Tn} < 6$
   $2.5 < m_{Tn}/m_{wn} < 4$
   wherein "$m_{Tn}$" represents a lateral magnification of said negative lens group at a long focal length position; and "$m_{wn}$" represents a lateral magnification of said negative lens group at a short focal length position.

2. A zoom lens system according to claim 1, wherein said first positive lens group and said negative lens group are moved together without changing a spatial distance therebetween during a zooming operation.

3. A zoom lens system according to claim 1, wherein said first positive lens group and said negative lens group are moved separately during said zooming operation.

4. A zoom lens system according to claim 1, wherein said negative lens group is comprised of at least three lenses including a positive lens, a negative lens and a positive lens, arranged in this order from said object side and satisfies the following relationships:
   $1 < f_T/f_{n-1} < 3$
   $1.7 < N_{n-2}$
   $10 < v_{n-2} - v_{n-3}$
   wherein "$f_T$" represents a focal length of a whole lens system at the telephoto extremity; "$f_{n-1}$" represents a focal length of an object side positive lens of said negative lens group; "$N_{n-2}$" represents a refractive index of an image-side positive lens of said negative lens group; "$v_{n-3}$" represents an Abbe number of said image-side positive lens of said negative lens group; and, "$v_{n-2}$" represents an Abbe number of said negative lens of said negative lens group.

5. A zoom lens system according to claim 4, wherein said object-side positive lens of said negative lens group is a plastic lens having at least one aspheric lens surface, and satisfies the following relationship:

$1 < f_T/f_{n-1} < 2.3$

6. A zoom lens system comprising:

at least three lens groups including a first positive lens group, a second positive lens group, and a negative lens group, arranged in order from an object side of said zoom lens system, said negative lens group comprising a positive lens, a negative lens, and a positive lens in order from an object side; and an aperture stop;

said three lens groups all being moved toward the object to be photographed during a zooming operation from a wide-angle extremity to a telephoto extremity, wherein a zoom ratio of said zoom lens system is greater than three, and wherein said negative lens group satisfies the following relationships:

$3.3 < m_{Tn} < 6$ $2.5 < m_{Tn}/m_{wn} < 4$ $1 < f_T/f_{n-1} < 3$ $1.7 < N_{n-2}$ $10 < v_{n-2} - v_{n-3}$ wherein "$m_{Tn}$" represents a lateral magnification of said negative lens group at a long focal length position; "$m_{wn}$" represents a lateral magnification of said negative lens group at a short focal length position; "$f_T$" represents a focal length of a whole lens system at the telephoto extremity; "$f_{n-1}$" represents a focal length of an object side positive lens of said negative lens group; "$N_{n-2}$" represents a refractive index of an image-side positive lens of said negative lens group; "$v_{n-2}$" represents an Abbe number of said image-side positive lens; and "$v_{n-3}$" represents an Abbe number of said negative lens of said negative lens group.

* * * * *